US008776112B2

(12) United States Patent
Roberts et al.

(10) Patent No.: US 8,776,112 B2
(45) Date of Patent: Jul. 8, 2014

(54) CONTENT HOSTING AND ADVERTISING SYSTEMS AND METHODS

(75) Inventors: Brian Roberts, Frisco, TX (US); Heath Stallings, Grapevine, TX (US); Don Relyea, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/478,492

(22) Filed: May 23, 2012

(65) Prior Publication Data
US 2012/0232999 A1    Sep. 13, 2012

Related U.S. Application Data

(63) Continuation of application No. 11/614,667, filed on Dec. 21, 2006, now Pat. No. 8,196,166.

(51) Int. Cl.
*H04N 7/025* (2006.01)
*H04N 7/10* (2006.01)

(52) U.S. Cl.
USPC .................. 725/34; 725/32; 725/33; 725/35; 725/36

(58) Field of Classification Search
USPC ...................................... 725/32–36; 705/14.4
See application file for complete search history.

(56) References Cited

U.S. PATENT DOCUMENTS

| | | |
|---|---|---|
| 7,146,627 B1 | 12/2006 | Ismail et al. |
| 2002/0010621 A1 | 1/2002 | Bell et al. |
| 2003/0037140 A1 * | 2/2003 | Aaltonen ....................... 709/225 |
| 2003/0149975 A1 | 8/2003 | Eldering et al. |
| 2005/0033657 A1 | 2/2005 | Herrington et al. |
| 2005/0216454 A1 | 9/2005 | Diab et al. |
| 2005/0246736 A1 | 11/2005 | Beyda et al. |
| 2005/0251820 A1 * | 11/2005 | Stefanik et al. .................. 725/34 |
| 2006/0117350 A1 | 6/2006 | Stallworth |
| 2006/0190616 A1 | 8/2006 | Mayerhofer et al. |
| 2006/0271972 A1 | 11/2006 | Pai et al. |
| 2007/0011700 A1 | 1/2007 | Johnson |
| 2007/0050244 A1 | 3/2007 | Stevens |
| 2007/0055986 A1 | 3/2007 | Gilley et al. |
| 2007/0100690 A1 | 5/2007 | Hopkins |
| 2007/0162335 A1 * | 7/2007 | Mekikian ......................... 705/14 |
| 2008/0046917 A1 | 2/2008 | de Heer |
| 2008/0092159 A1 | 4/2008 | Dmitriev et al. |
| 2008/0109325 A1 | 5/2008 | Cella et al. |
| 2008/0195458 A1 * | 8/2008 | Anschutz et al. ............... 705/10 |

* cited by examiner

*Primary Examiner* — Mulugeta Mengesha

(57) ABSTRACT

In an exemplary system, a data store includes at least a subset of media content, media content attribute data associated with the media content, user profile data associated with at least one consumer having access to the media content, advertising content, and content matching data associated with the advertising content. An access module is communicatively coupled to an access device and configured to receive a request sent by the access device, the request being for access to a media content instance included in the media content. A matching module is configured to match at least one advertising content instance included in the advertising content to the media content instance based on the media content attribute data, user profile data, and content matching data. The access module is configured to provide the matched advertising content instance to the access device for user presentation.

19 Claims, 7 Drawing Sheets

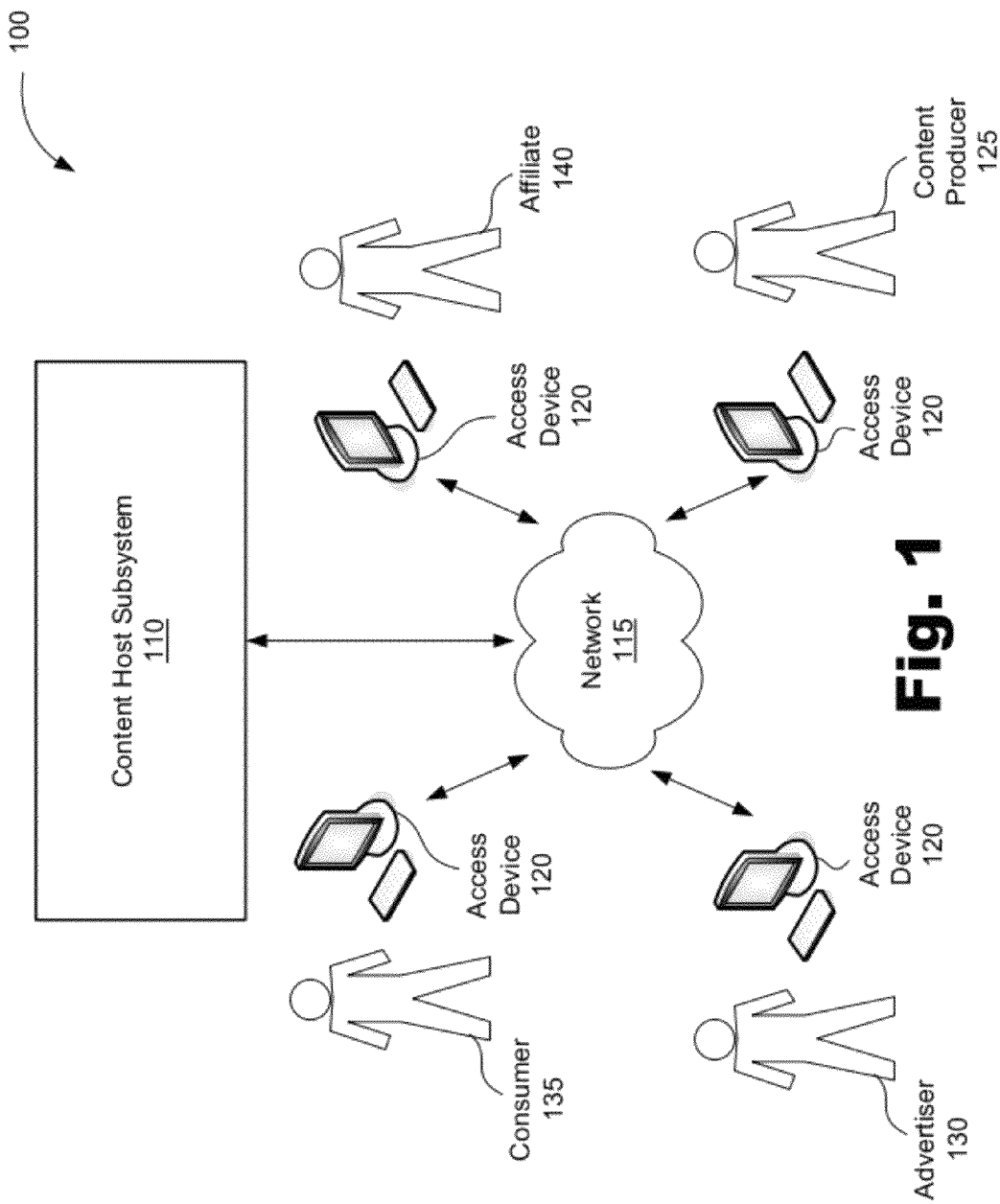

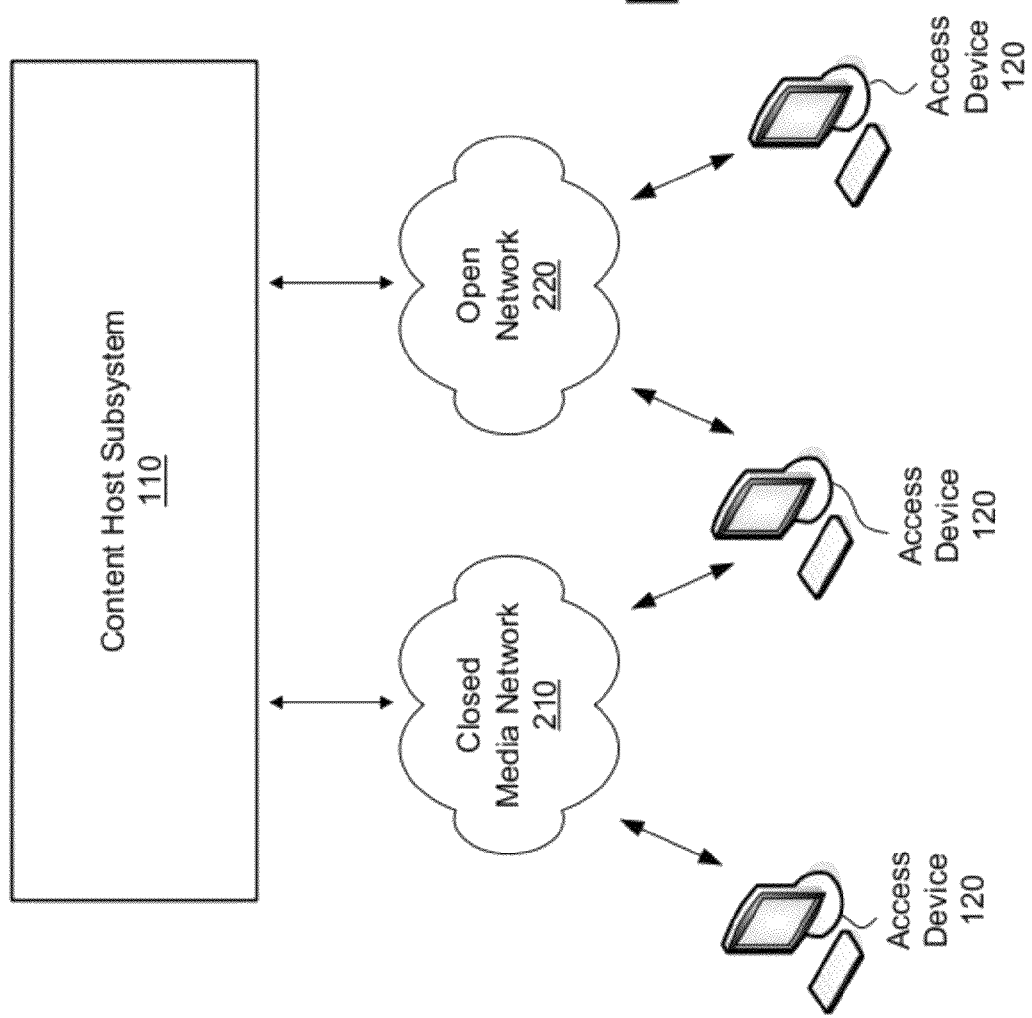

Stats Summary

Media
23 Active

Avg. Rating
★★★★

Avail. Balance
$76,486.03

Avg. Rev. per Ad
$0.07

Total YTD Ad Rev.
$147,932.39

Transferred (YTD)
$71,446.36

Downloads (YTD)
2,010,452

Current No DL/min
87

Add/Remove Media
Ratings & Reviews
Income
Statistics
Media Stats
Vlog
Messages
Settings 1. Image — Mothers Day
Published:.....................May 23, 2006
Ad Revenue:......................$81,237.80
Downloads:........................1,160,540
Avg. User Rating (7,345):........★★★

2. Image — Auto Insurance
Published:......................June 9, 2006
Ad Revenue:........................$8,099.77
Downloads:..........................115,711
Avg. User Rating (1,973):........★★

3. Image — Ninja Rap
Published:.....................July 12, 2006
Ad Revenue:........................$5,952.31
Downloads:...........................85,033
Avg. User Rating (813):..........★★★

4. Image — Gonzaga Love
Published:.....................July 23, 2006
Ad Revenue:........................$5,243.07
Downloads:...........................74,901
Avg. User Rating (624):..........★★★

Fig. 3

Stats Summary

Ads
9 Active

Avg. Rating
★★★

Current Balance
$67,621.04

Avg. Fee per View
$1.43

Total YTD Ad Fees
$221,332.31

Views (YTD)
156,461

Current Number
Views/min
14

1 | Image | Ad Title
Start/End Dates:..............July 1-31, 2006
Ad Fees:..............$11,125.80
No. Views:..............12,305
Avg. Fee per View:..............$0.90
Maximum Fee:..............$1,000/day 2 | Image | Ad Title
Start/End Dates:..............July 6-31, 2006
Ad Fees:..............$3,684.03
No. Views:..............6,951
Avg. Fee per View:..............$0.53
Maximum Fee:..............$20,000 total 3 | Image | Ad Title
Start/End Dates:..............July 8 – Aug 8, 2006
Ad Fees:..............$9,311.10
No. Views:..............3,785
Avg. Fee per View:..............$2.46
Maximum Fee:..............$30,000 total 4 | Image | Ad Title
Start/End Dates:..............July 8 – Aug 8, 2006
Ad Fees:..............$8,016.93
No. Views:..............951
Avg. Fee per View:..............$8.43
Maximum Fee:..............$3,000/day Add/Remove Ads
Ratings & Reviews
Fees
Statistics
Ad Stats
Messages
Settings

400

Fig. 4

CONTENT HOSTING AND ADVERTISING SYSTEMS AND METHODS

CROSS REFERENCE TO RELATED APPLICATIONS

This application is a continuation of U.S. patent application Ser. No. 11/614,667, filed on Dec. 21, 2006, by Brian Roberts et al., entitled CONTENT HOSTING AND ADVERTISING SYSTEMS AND METHODS, which issued into U.S. Pat. No. 8,196,166 on Jun. 5, 2012, the contents of which is hereby incorporated by reference in its entirety.

BACKGROUND INFORMATION

Advances in the digital realm of consumer electronics and communications have made media content widely accessible to consumers. Consumers can choose from an assortment of media content provided on various outlets such as the Internet or subscriber television systems.

With an abundance of available media content and media content outlets, advertisers have numerous options for disseminating their advertisements. In general, advertisers seek to associate their advertisements with media content and media content outlets that will maximize the effectiveness of and return on investment generated by the advertisements.

One determining factor for the effectiveness of an advertisement campaign is the ability to target the campaign to an interested audience (i.e., a target audience). While conventional target advertising techniques can improve the effectiveness of an advertisement, there remains room for improvement. In the context of traditional broadcast television systems, for example, advertisements may be selected and inserted into commercial segments of programs based on geographic locations. For instance, when a particular television program is broadcast to a wide audience (e.g., a national audience), different local advertisements may be inserted for different geographic regions. However, such targeting is very broad and does not ensure that a particular viewer will experience advertisements that are interesting or relevant.

By way of another example, some conventional advertising techniques selectively identify and include advertisements in a presentation of a web page. The advertisements may be selected based on keywords that are determined to be related to the content of the web page. In theory, the matching of an advertisement keyword to the content of the web page provides a form of targeted advertising. However, the targeting is very broad and does not account for individual preferences or demographics. Selecting an advertisement based solely on the content of the web page requires that a content-based assumption be made about the demographics of the person viewing the web page. In some cases, the assumption may be wrong, and the person may be presented with advertisements that are of little or no interest.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

FIG. 1 illustrates an example of a content hosting and advertising system.

FIG. 2 is an illustration of an exemplary configuration of the content hosting and advertising system of FIG. 1.

FIG. 3 is an illustration of an exemplary graphical user interface that may be presented to a content producer.

FIG. 4 is an illustration of an exemplary graphical user interface that may be presented to an advertiser.

DETAILED DESCRIPTION

I. Introduction

Figure 5:
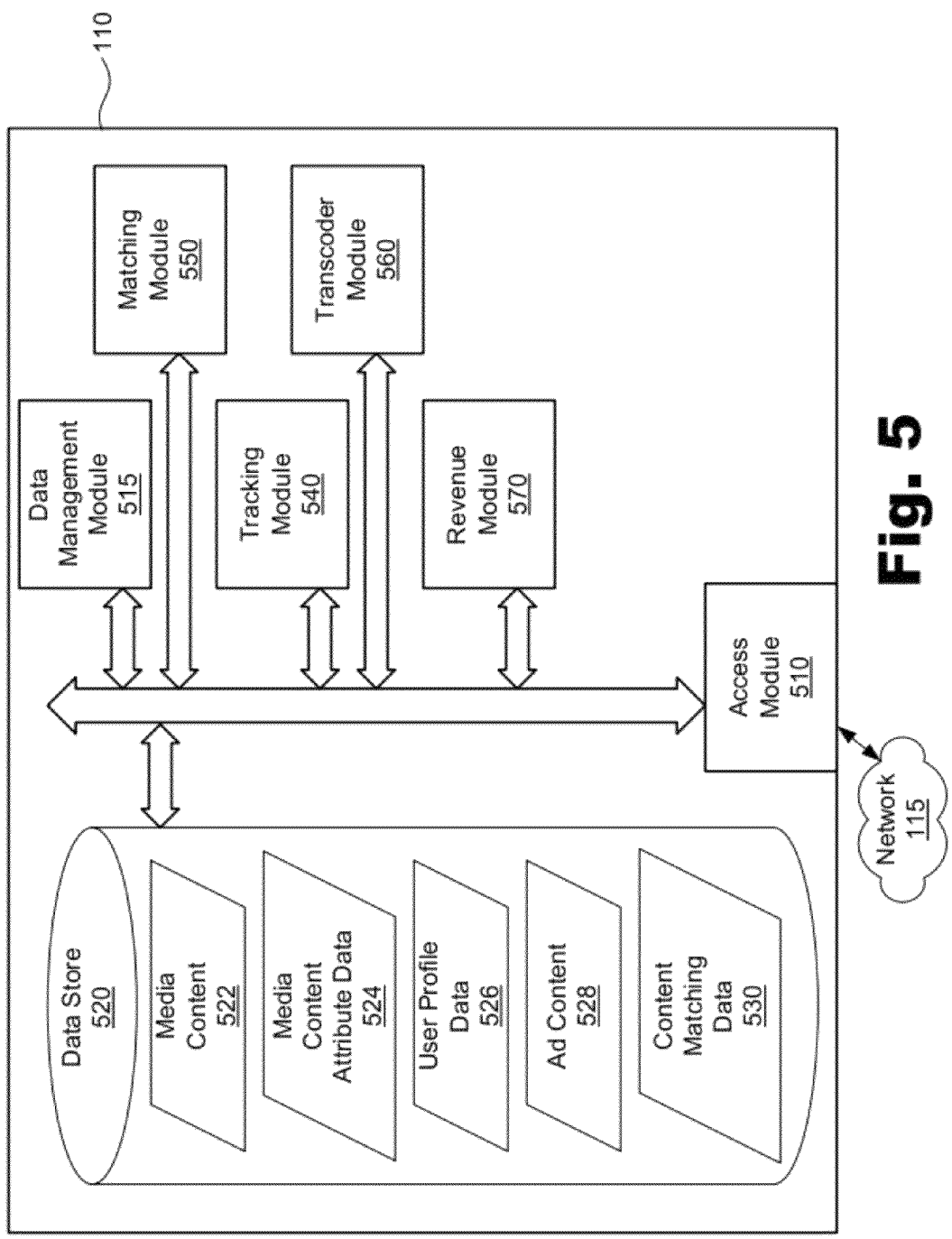
FIG. 5 illustrates an exemplary content host subsystem.

Exemplary content hosting and advertising systems and methods are described herein. In some examples, a content host subsystem is configured to host media and advertising content. The media content may include one or more media content instances, which term, as used herein, refers generally to any television program, on-demand program, pay-per-view program, broadcast media program, video-on-demand program, independently-produced media, studio-produced media, video, multimedia, movie, song, photograph, audio programming, or any segment, portion, component, or combination of these or other forms of media content that may be presented to and experienced (e.g., viewed) by a user. A media content instance may have one or more components. For example, an exemplary media content instance may include a video component and an audio component. The advertising content may include one or more advertising content instances, which term, as used herein, refers generally to any sponsored video, multimedia, movie, song, photograph, audio programming, or any segment, portion, component, or combination of these or other forms of advertising content that is sponsored by an advertiser and that may be presented to and experienced (e.g., viewed) by a user.

The content host subsystem may receive media content from content producers and advertising content from advertisers. The content producers and advertisers may use access devices to provide (e.g., upload) the content to the content host subsystem over at least one network. The content host subsystem can distribute the media and advertising content for experiencing by consumers. The content may be distributed to the consumers over the network and may be provided in response to consumer requests to access media content.

The content host subsystem may be configured to dynamically match advertising content to media content in a targeted manner. When a request for access to a media content instance is received from a user, for example, the content host subsystem can select at least one advertising content instance that is targeted at the media content instance and/or the user requesting the media content instance. The selection may be determined based on user profile data associated with the user, media content attribute data associated with the media content instance, and content matching data associated with the advertising content provided by the advertisers. The selected advertising content instance may be provided for presentation to the user. The advertising content can be presented along with (e.g., at the beginning of the) the media content instance.

Examples of user profile data, media content attribute data, and content matching data are described in detail further below. In general, the user profile data, media content attribute data, and content matching data enable the content matching subsystem to match advertising content to media content in a highly targeted manner and based on user-provided data and/or up-to-date real time data. With this data, dynamic matching can be based on real time snapshots of micro-scale (i.e., "sliver") demographics, including demographics specific to individuals, media attributes, and tracked events.

Accordingly, the exemplary systems and methods described herein can benefit advertisers by providing significant capabilities for highly targeted advertising. Advertisers may experience increased returns on investment and may be willing to pay premiums for the robust targeting capabilities of the systems and methods described herein.

Consumers can also benefit. Consumers are generally very likely to be presented with relevant and interesting advertisements. The number of irrelevant or uninteresting advertisements experienced by users may be relatively few as compared to conventional targeted advertising services. With dynamic placement of advertising content, consumers may be presented with advertisements that are selected based on current content matching data. In certain embodiments, different advertisements may be matched for different viewings of the same media content that has been recorded by a consumer. That is, the advertisements included in the original recording of the media content can be updated with different advertisements for a subsequent viewing of the media content.

Content producers can also benefit from the systems and methods described herein. In certain embodiments, content producers can elect to share advertising revenue generated from advertisements being matched to the media content provided by the content producers. For example, a content producer may opt-in to a revenue sharing plan, and the content producer may receive a share of advertising fees that are charged to advertisers when their advertisements are matched to media content provided by the content producer. Accordingly, content producers have incentives to provide media content, such incentives including the distribution of the content and the potential to receive revenue for the distribution of the content. In some examples, a share of revenue may be rewarded for each time media content is accessed, which can give content producers incentive to produce quality content.

One or more parties distributing the media content can also benefit from the systems and methods described herein. In some embodiments, for example, a distributor may be awarded a share of the advertising revenues. In addition, a potential to share revenue may attract content producers and quality media content to the distributor, thereby enhancing the library of media content hosted by the distributor. A library of differentiating content can increase the appeal of services provided by the distributor.

Components, functions, and benefits of exemplary embodiments of content hosting and advertising systems and methods will now be described in more detail.

II. Exemplary System View

FIG. 1 illustrates an example of a content hosting and advertising system 100, according to one embodiment. As shown in FIG. 1, content hosting and advertising system 100 (or simply "system 100") may include a content host subsystem 110 communicatively connected to a plurality of access devices 120 by network 115. The access devices 120 and the content host subsystem 110 may communicate over the network 115 using any suitable communication technologies, including any of those described below.

The access devices 120 may be associated with and/or operated by different categories of users or entities, including content producers, advertisers, consumers, and affiliates. For example, a first access device 120 may be operated by a content producer 125, a second access device 120 may be operated by an advertiser 130, a third access device 120 may be operated by a consumer 135, and a fourth access device 120 may be operated by an affiliate 140. While FIG. 1 shows one content producer 125, one advertiser 130, one consumer 135, and one affiliate 140 each associated with a different access device 120, this is illustrative only. Typically, there may be multiple content producers 125, advertisers 130, consumers 135, and affiliates 140 associated with various access devices 120.

The content host subsystem 110 may be configured to recognize the category of a user and provide a particular user interface (e.g., a graphical user interface) to the user based on the category. For example, the content host subsystem 110 may provide the content producer 125 with a content producer interface, the advertiser 130 with an advertiser interface, the consumer 135 with a consumer interface, and the affiliate 140 with an affiliate interface. Through the various user interfaces, users are able to provide and receive content and information to/from the content host subsystem 110. For example, content producers 125 may provide media content, advertisers 130 may provide advertising content, consumers 135 may request media content, and the content host subsystem 110 may dynamically match advertising content to requested media content and provide the matched content for experiencing by consumers 135, as described below.

A user or entity may be associated with one or more user categories. Thus, there may be some overlap of categories among users. For example, a particular user who uploads advertising content may be associated with an advertiser category. The same user may also upload media content and be associated with a content producer category. This is just one example. Other overlaps of categories may be accommodated by the system 100. Each of the components of the system 100 will now be described in additional detail.

A. Network

The access devices 120 and the content host subsystem 110 may communicate over the network 115 (and communication links thereto) using any known communication technologies, devices, media, and protocols supportive of remote data communications, including, but not limited to, data transmission media, communications devices, Transmission Control Protocol ("TCP"), Internet Protocol ("IP"), File Transfer Protocol ("FTP"), Telnet, Hypertext Transfer Protocol ("HTTP"), Session Initiation Protocol ("SIP"), socket connections, Ethernet, and other suitable communications networks and technologies.

The network 115 may include one or more networks, including, but not limited to, closed media networks, cable networks, subscriber television networks, satellite networks, the Internet, intranets, local area networks, wireless networks (e.g., mobile telephone networks), public networks, private networks, optical fiber networks, and any networks used for gaming or virtual simulation applications. In certain exemplary embodiments, the network 115 includes a broadband network capable of delivering different services (e.g., media content services, Internet access services, and voice communication services) to the access devices 120.

Communications between the content host subsystem 110 and the access devices 120 may be carried using any one of above-listed networks, or any combination of the above-listed networks. In certain embodiments, network 115 may include one or more provider-specific networks (e.g., a wireless telephone network and/or subscriber television network such as a Verizon® FIOS® network) and one or more open networks (e.g., the Internet).

FIG. 2 illustrates an exemplary configuration of system 100 in which the content host subsystem 110 may communicate with access devices 120 over a closed media network 210 and/or an open network 220. The closed media network 210 may include one or more closed media networks configured to provide media content to authenticated users (e.g., subscribers). In certain embodiments, the closed media network 210 is closed at least because a content provider associated with the content host subsystem 110 controls the media content made available over the network 210.

In certain embodiments, the closed media network 210 includes a subscriber television network such as a cable television network, satellite television network, optical fiber television network, a provider-specific television network (e.g., a Verizon® FIOS® network and/or a TiVo® network), a provider-specific broadband network, a wireless communication (e.g., cellular) network, a telephone network, or any combination thereof. In other embodiments, the closed media network 210 may include different closed networks providing subscribers with access to other types of media and/or communication content, including a satellite media broadcasting network or terrestrial media broadcasting network (e.g., satellite radio), for example. In certain embodiments, the content host subsystem 110 provides media content to subscribers who pay a premium for service (e.g., a subscription).

The open network 220 may include one or more open networks configured to carry content (e.g., media content) to access devices 120 connected to the network 220. In certain embodiments, the open network 220 is open at least because content from more than one provider (e.g., content from providers other than the content provider associated with the content host subsystem 110) can be made available on the open network 220. The open network 220 may include the Internet.

As described below, in certain examples the closed nature of the closed media network 210 may be utilized by the content host subsystem 110 to match advertising content to media content. For example, the content host subsystem 110 may track media consumption on the closed media network 210 and use the tracked data to derive detailed user profile data including data representative of consumer media consumption events and habits, which data can be used to match advertising content to consumers 135 on an individual and highly detailed level. The data derived from the closed media network 210 may be extrapolated and used to fill in user profile data that may be lacking for certain consumers 135 accessing media content over the open network 220.

B. Access Device

Access device 120 may include any device physically or remotely accessible to one or more users and that allows a user to provide content and information to and/or receive content and information from the content host subsystem 110. For example, a user utilizing an access device 120 may request, receive, and experience media and/or advertising content provided by the content host subsystem 110. Another user utilizing an access device may provide (e.g., upload) media or advertising content and corresponding data to the content host subsystem 110.

Access device 120 can include, but is not limited to, one or more desktop computers, laptop computers, tablet computers, personal computers, personal data assistants, wireless communication devices (e.g., cellular telephones and satellite pagers), wireless internet devices, embedded computers, video phones, Verizon One® phones, video-enabled wireless phones, mainframe computers, mini-computers, vehicular computers, entertainment devices, gaming devices, music devices, closed media network access devices, set-top boxes, digital video recorders, personal video recorders, any network-connected device having a display or content processing capability, content recording devices (e.g., video cameras such as camcorders and still-shot digital cameras), and any other devices capable of providing content to and/or receiving content from the content host subsystem 110. Access device 120 can also include various peripherals such as a terminal, keyboard, mouse, display screen, printer, stylus, input device, output device, or any other apparatus that can help provide interaction with access device 120.

Access device 120 may include instructions for generating and operating one or more user interfaces. These instructions may be in any computer-readable format, including software, firmware, microcode, and the like. When executed by a processor (not shown) of access device 120, the instructions may present a user interface to a user. The user interfaces may include content and data provided by the content host subsystem 110. As described below, the content host subsystem 110 may provide different user interface content and data based on a category of user utilizing an access device 120. Exemplary categories of users and corresponding user interfaces will now be described.

C. Content Producer

Content producer 125 may include any person or entity providing media content to the content host subsystem 110. The media content may be provided in any suitable manner, including uploading the content over network 115. The content producer 125 may be independent or associated with a studio. Accordingly, the media content hosted by the content host subsystem 110 may include independent and/or studio-produced media content. While FIG. 1 shows the content producer 125 being able to provide media content by way of an access device 120 (e.g., a personal computer or wireless phone) and network 115, this is illustrative only. In other examples, a content producer 125 may provide media content directly to the content host subsystem 110.

In addition to media content, content producer 125 may provide data to be associated with the media content. Such data may be referred to as media content attribute data, which may include any metadata and/or other information (e.g., keyword tags) descriptive of media content or content provider attributes. Media content attributes may include, but are not limited to, content subject matter, genre (e.g., comedy, drama), production date, release date, cast and crew names, content ratings (e.g., general, mature, etc.), intended audience (i.e., target audience), and synopsis of the media content. Content provider attributes may include, but are not limited to, producer names and producer biographies. The media content attribute data may include any information potentially helpful for attracting consumer traffic to the media content, including keywords that can be identified when consumers 135 search for media content. The media content attribute data may include data provided by content producers 125, as well as data generated by the content host subsystem 110, as described below.

The media content attribute data can be used by the content host subsystem 110 to match advertising content to media content in a highly targeted manner, as described below. The media content attribute data (e.g., metadata) can be used for identifying and flagging media content. For example, a user may search for and/or flag a media content instance having a specific metadata value (e.g., a particular actor name). Moreover, the system 100 may be configured to recommend media content to users based on metadata. Thus, the metadata can promote the viral spreading of uploaded media content and augment the ability of the system 100 to target advertising content at a high level of detail (e.g., at a sliver demographic level).

When receiving media content from a content producer 125, the content host subsystem 110 may be configured to request subscription information from the content producer 125. Subscription information may include producer contact information, billing information, and a selection of a subscription plan. In some examples, the content host subsystem 110 may provide different subscription plans from which the content producer 125 may choose. For example, a certain amount of media content within a first tier (e.g., up to two gigabytes of data storage) may be uploaded and hosted by the content host subsystem 110 free of charge under a first subscription plan, a second subscription plan may charge a fee for an additional amount of data storage, a third subscription plan may charge a larger fee for an increased amount of data storage, and so on.

In accordance with the subscription plans, the content host subsystem 110 may function as a host (e.g., a repository) of media content and can distribute the media content to consumers 135. In other words, the content host subsystem 110 provides tools to content producers 125 to facilitate distribution of their content.

Other value added services may be provided as part of certain subscription plans. For example, certain subscription plans may allow content producers 125 to set an amount to be charged for each access (e.g., download or viewing) of media content. For example, providers of pay-per-view or on-demand content may establish a price to be charged for each download of the content. Another example of a value-added service includes placement of content producer information in a searchable business directory.

The content host subsystem 110 may also provide the content producer 125 with advertising and revenue options, and the content producer 125 may choose to participate in (e.g., opt into) these options. For example, the content producer 125 may determine whether to enable or disable advertising content matching for media content. When advertising content matching is enabled for media content, the content host subsystem 110 may dynamically match advertising content to the media content, as described herein. Accordingly, the content host subsystem 110 can provide relevant and interesting advertising content for presentation along with the media content. For example, a selected advertising content instance may be matched to and presented before a media content instance is presented. Examples of advertising matching will be described further below.

As an incentive to participate in advertising matching, the content host subsystem 110 may be configured to share advertising revenue with the content producer 125. With advertising matching enabled, the content host subsystem 110 may provide the content producer 125 with a share of advertising revenue generated by media content provided by the content producer 125. As described below, advertisers 130 may pay when their advertising content is matched to media content. The content host subsystem 110 may be configured to track the advertising revenue generated by the media content. The revenue may be shared between the content producer 125 and one or more parties distributing the media content (e.g., a party operating the content host subsystem 110). In this manner, advertising revenue can be used to compensate content producers 125 for their media content. Examples of revenue sharing will be described in more detail further below.

The content producer 125 may provide information related to payment of revenue shares. For example, the content producer 125 may provide payment information (e.g., payment method, account identifiers, and/or address information) descriptive of how the content producer 125 wishes to receive revenue payments. The content producer 125 may also provide information descriptive of how its share of the revenue is to be divided up between different collaborators or other contributors to the media content. Payment information and revenue sharing ratios may be provided such that the content host subsystem 110 is able to automatically allocate and pay out the revenue in accordance with the information provided by the content producer 125.

In some examples, the content host subsystem 110 may provide the content producer 125 with an option of choosing to allocate at least a portion of earned revenue to be invested in marketing of the media content hosted by the content host subsystem 110. For example, the content producer 125 may pay for featured placement of media content, or to have the media content, or trailers or snippets of the media content marketed in relation to other media content.

The content producer 125 may also determine whether to enable (e.g., opt in) content syndication for media content. With content syndication enabled, the content host subsystem 110 is configured to allow an affiliate 140 (shown in FIG. 1) to promote the media content. For example, the affiliate 140 may post a link to the media content on another platform such as a blog or web page operated by the affiliate 140 or other third party. When a consumer 135 accesses the media content through the third-party promotion, advertising revenue generated by the presentation of the media content and selected advertising content may be shared between the affiliate 140, the content producer 125, and the party operating the content host subsystem 110. Content syndication may help to virally increase the number of viewers and the quantified popularity of media content, as well as the advertising revenue generated by the media content.

The content host subsystem 110 may be configured to provide the content producer 125 with one or more user interfaces having tools enabling the content producer 125 to provide media content and associated information. The user interface may also include tools for tracking and managing media content that has been provided to the content host subsystem 110. The tools may enable the content producer 125 to monitor the performance of and revenue raised by published media content. Information provided to the content producer 125 through a content producer interface may include, but is not limited to, a list of published media content instances, statistics about the performance and/or distribution of the media content, content syndication statistics, revenue statistics, demographic information associated with consumers 125 accessing the media content, and feedback (e.g., ratings) provided by consumers 125.

FIG. 3 illustrates an exemplary graphical user interface 300 that may be presented to the content producer 125 by way of an access device 120. As shown in FIG. 3, the graphical user interface 300 may provide tools for managing media content and associated accounts. Exemplary tools may enable the content producer 125 to add and remove media content, view ratings and reviews of media content, view income generated by the media content, view information about advertisers 130 and/or associated advertisements that have been matched to media content, view of advertising fees paid for advertising content matches to media content, view overall statistics for the content producer 125 or for media content, view media content-specific statistics, view messages from other users, view and change settings (e.g., the media content attribute data and/or subscription settings associated with media content), and link to other user interfaces such as a V-log associated with the content producer 125.

In the view shown in FIG. 3, a media content-specific statistics option (i.e., "Media Stats") is selected and corresponding information displayed. With this option selected, the graphical user interface 300 may present a list of published media content instances and information (e.g., statistics) associated with each media content instance. Examples of such information may include but are not limited to a media content identifier (e.g., a title), visual image from the media content instance, publication date, the number of times the media content instance has been accessed (e.g., viewed, downloaded, or otherwise experienced by consumers 135), the amount of revenue raised by the media content instance, user rating information (e.g., the average user rating for the media content instance), and the number of users that have rated the media content instance. The example shown in FIG. 3 is illustrative only and not restrictive in any sense. In other examples, different or additional information may be provided to the content producer 125 in a user interface. For example, daily performance or revenue statistics may be shown and may include a graphical chart illustrating the number of downloads per day. In certain examples, the content producer 125 is able to view detailed statistics related to the performance of media content. The detailed statistics may be at any level of granularity, including information for each instance of an advertisement being matched to media content and/or a fee paid for the match.

The graphical user interface 300 may also include a summary of statistics for the content producer 125. The summary may include, but is not limited to, the number of active media content instances (e.g., active videos), an overall average consumer rating of published media content, total number of access (i.e., media consumption) events (e.g., downloads) for the active media content instances, the current rate at which media content is being accessed (e.g., current number of downloads per minute), and overall revenue information such as total revenue earned (e.g., year-to-date revenue), total revenue collected from advertisers 130, total revenue transferred to the content producer 125, available revenue balance, and overall average revenue per advertisement.

Through the graphical user interface 300, which may also be referred to as a content producer interface 300 or content producer dashboard 300, content producer 125 is able to view and manage media content instances, including viewing any of the above-described information, publishing new media content instances, removing published media content instances, setting access prices for media content instances such as on-demand and pay-per-view media content instances, and modifying information (e.g., media content attribute data) associated with the media content instances. For example, the content producer 125 may modify media content attribute data such as target audience information to attempt to improve the performance of the corresponding media content instance.

The content producer dashboard 300 provides the content provider 125 with robust capabilities to publish media content, manage published media content, and monitor the distribution and performance (e.g., revenue generated by) the media content. The information included in the content producer dashboard 300 may include up-to-date information that is updated in real time or near real time. For example, upon detecting a download of a published media content instance, the content host subsystem 110 may provide updated download and revenue data for inclusion in the dashboard 300. The above-described information that may be included in the content producer dashboard 300 and that relates to the distribution or performance of media content may be collectively referred to as real time performance metrics. The type and/or amount of information included in the real time performance metrics may be based on service level agreements. Thus, in certain embodiments, a content producer 125 may pay a premium for access to certain information.

With the above-described tools, the content producer 125 is able to conveniently publish media content. Moreover, the content producer 125 has significant control over the data that will be used by the content host subsystem 110 to identify and provide media content to consumers 135 and to select advertising content to be matched to the media content. In addition, the content producer 125 can monitor the real-time performance of the media content, including the advertising income generated by the media content. Accordingly, the system 100 provides for an effective distribution of media content, as well as content producer compensation in the form of income that is based on the performance of the media content.

D. Consumer

The content host subsystem 110 may distribute the media content received from content producers 125 for experiencing by consumers 135. For example, a media content instance uploaded by a content producer 125 may be made available for experiencing by consumers 135 using access devices 120 communicatively connected to the content host subsystem 110 by the network 115.

Consumers 135 may initiate requests to access media content hosted by the content host subsystem 110. The requests may be initiated in any suitable manner, and data representative of a request may be sent from an access device 120 to the content host subsystem 110. The access requests may include requests to download media content from the content host subsystem 110 to an access device (e.g., for playback or recording), or requests to playback media content that has been previously downloaded from the content host subsystem 110 and stored locally on an access device 110. Accordingly, a consumer 135 may include any person or entity accessing and/or experiencing media content hosted by the content host subsystem 110.

As described further below, when requests to access media content are received, the content host subsystem 110 can match advertising content to the requested media content such that the advertising content can be presented to consumers 135 along with the media content. The matching may be performed in a highly targeted manner such that consumers 135 experience relevant and interesting advertising content.

The content host subsystem 110 may be configured to provide consumers 135 with tools for and related to experiencing content. For example, tools may be provided that enable a consumer 135 to rate content (e.g., by providing a star rating for media and/or advertising content), rank content with respect to other content, provide feedback and reviews of content, rate feedback provided by other consumers 135, assess the value of feedback provided by other consumers 135 based on a similarity score (i.e., a score based on how similarly consumers 135 rated content and/or the similarity of viewing habits of the consumers 135), form communities of consumers 135 (e.g., discussion groups), add content to a list of favorites, flag content as described in U.S. patent application Ser. No. 11/474,992, by Heath Stallings et al., entitled MEDIA CONTENT ACCESS SYSTEMS AND METHODS, filed Jun. 27, 2006, the content of which is hereby incorporated by reference in its entirety, share content or snippets of content as described in U.S. patent application Ser. No. 11/474,991, by Heath Stallings et al., entitled SNIPPET ACCESS SYSTEMS AND METHODS, filed Jun. 27, 2006, the content of which is hereby incorporated by reference in its entirety, post links to or otherwise promote content on other platforms (e.g., on a consumer blog or web page), find and access top-rated or most popular content (based on quantified popularity scores for media content), share playlists, view snippets of content, view trailers of content, set reminders for pay-per-view or other content distribution events, purchase content, download content, view content, and any other tool that is potentially helpful for enhancing the experience of the consumer 135 and/or for enabling the consumer 135 to communicate with others about the experience. Accordingly, consumers 135 are able to help facilitate a viral distribution of content.

In system 100, the consumer 135 has an associated user profile including user profile data descriptive of attributes, demographics, actions, and/or habits of the consumer 135. The user profile may be maintained by the content host subsystem 110. In certain embodiments, each consumer 135 who is able to consume content provided by the content host subsystem 110 has an associated user profile maintained by the content host subsystem 110. User profiles may include various information and various levels of detail for different consumers 135.

User profile data may be accounted for when matching advertising content to media content. Accordingly, advertising content can be targeted to specific consumers 135 on an individual basis. User profile data may include any information descriptive of consumer contact information, age, age group, gender, marital status, income level, ethnicity, religion, political affiliation, interests, hobbies, preferences, home owner versus renter status, credit score, geographic identifier (e.g., address, zip code, or area code), buddy lists, group memberships or affiliations, digital rights management information, and any other consumer demographic information. User profile data may be voluntarily provided by the consumer 135 via an access device 120. In some example, incentives (e.g., reduced subscription rates or the potential to not receive irrelevant or uninteresting advertisements) may be offered to consumers 135 in exchange for certain user profile information.

In addition to user-provided information, user profile data may also include information generated by the content host subsystem 110, including, for example, information about media consumption events and habits (e.g., viewing or download logs or histories) exhibited by the consumer 135 and tracked by the content host subsystem 110. For instance, the user profile data may indicate the media content instances that have been recently accessed (e.g., downloaded) by the consumer 135. These may be referred to as media consumption events, and the content host subsystem 110 may track and record the events to generate a media consumption history. The tracked media consumption events may be used to derive demographic information about users (e.g., media content ratings for media content accessed by a user).

As described below, tracked user profile data can be considered when matching advertising content to media content. In certain embodiments, tracked user profile data may be combined with and/or given more weight than consumer-provided user profile data for purposes of matching advertising content to media content. For example, the consumer 135 may provide certain demographic information indicative of a first demographic group, but the tracked viewing habits of the consumer 125 may be more in line with another demographic group. The content host subsystem 110 may be configured to recognize this situation and place more weight on the tracked demographic data (e.g., viewing habits) than on the consumer-provided demographic data.

The content host subsystem 110 may be configured to provide consumer user interfaces to consumers 135. The consumer user interfaces may provide the consumers 135 with tools for performing any of the above-described functions, including requesting access to, receiving, experiencing, and rating media and advertising content. A consumer user interface may also provide a consumer 135 with tools for managing his user profile, including providing and updating user profile data.

A consumer 135 may utilize a user interface to provide user profile data that can be used by the content host subsystem 110 to determined content to be or not to be provided to the consumer 135. The consumer 135 can use this as a tool for controlling what content is provided to the consumer 135. For example, a consumer 135 may rate an advertisement. If the consumer 135 provides a negative rating that is below a predetermined threshold, the content host subsystem 110 may prevent the same advertisement from being provided to the consumer 135 in the future. In this manner, the consumer 135 can provided data for screening advertisements, including advertisements that may be offensive, irrelevant, or unwanted.

E. Affiliate

An affiliate 140 may include any person or entity promoting the content of another. For example, an affiliate 140 may include a consumer 135, content producer 125, or other person or entity who promotes content of another hosted by the content host subsystem 110. An affiliate promotion may include a link posted on another platform or at another access point such as a website (e.g., a third-party website such as www.myspace.com), blog, or V-log associated with the affiliate 140 or a third party. When a person actuates the link, a call is made to the content host subsystem 110, and the person may be redirected to or provided with an application and/or user interface provided by the content host subsystem 110. The application may include an embedded media player configured to present the content associated with the link and hosted by the content host subsystem 110. The embedded media player may be configured to enable the content host subsystem 110 to continue to enforce digital rights management considerations for indirectly accessed media content. The embedded media player may also enable the content host subsystem 110 to track distribution of and data associated with indirect media distribution and consumption.

Another example of an affiliate promotion is a stitching of media content of one content producer 125 to the media content of another content producer 125. For example, a first media content instance may be stitched at the beginning of a second media content instance for presentation along with the second media content instance. The content producer 125 associated with the second media content instance may proactively allow the content host subsystem 110 to attach other media content and may be compensated for the allowance. Such a content producer 125 may also be an affiliate 140. In other words, a consumer 135 can become an affiliate 140 by opting into a revenue sharing plan and promoting the content of another.

Affiliates 140 may be rewarded for promoting content of others. For example, an affiliate 140 may receive a share of advertising revenue raised in association with the promoted content. This may be referred to compensated syndication, which can help to virally spread content to a wide audience of potential viewers. In this manner, the distribution, popularity, and value of media content can be maximized quickly, thereby leading to increased revenue from advertisers 130.

F. Advertiser

Advertiser 130 may include any person or entity providing advertising content to the content host subsystem 110. Typically, the advertiser 130 sponsors the advertising content by agreeing to pay for its distribution to consumers 135. The advertising content may be provided in any suitable manner, including uploading the content over network 115. While FIG. 1 shows the advertiser 130 being able to provide advertising content by way of an access device 120 and network 115, this is illustrative only. In other examples, an advertiser 130 may provide advertising content directly to the content host subsystem 110.

In addition to advertising content, the advertiser 130 may provide data associated with the advertising content. Such data, which may be referred to as content matching data, may include, but is not limited to, any information descriptive of the advertising content and/or the advertiser 130. For example, the content matching data may include descriptors (e.g., keywords) descriptive of the advertising content or attributes of the advertising content, including advertisement subject matter, genre, length, data format type, data storage requirements, content rating (e.g., for general or mature audiences), and quality level (e.g., video quality level and/or resolution), for example.

Content matching data may include advertiser-specified criteria to be considered when matching the advertising content to media content. For example, the content matching data may specify any media content attributes and/or content producer attributes that should be associated with any media content instance to which the advertising content may be matched. Examples of such attributes may include any of the media content attribute data described above, including descriptors of media content subject matter, genre (e.g., comedy, drama), production date, release date, cast and crew names, content ratings (e.g., general, mature, etc.), intended audience, as well as producer names and biographies.

Any targeted media content attributes included in the content matching data may be referred to as targeted media content criteria. For example, content matching data may include targeted media content popularity criteria and targeted media content rating criteria.

Content matching data may further include advertiser-specified consumer attributes that should be associated with any consumer 135 accessing media content to which the advertising content may be matched. Advertiser-specified consumer attributes may include any user profile data described above, including consumer-provided demographic information and/or tracked consumer attributes (tracked media consumption events and/or habits).

Any targeted consumer attributes included in the content matching data may be referred to as targeted consumer criteria. For example, content matching data may include targeted user demographic criteria.

Content matching data may also specify exclusionary criteria, including any media content attributes, content provider attributes, and/or user profile data that should be used as grounds for precluding a match of advertising content to the corresponding media content. In other words, advertiser 130 may provide exclusionary content matching data that can be used to prevent advertising content from being matched with media content possessing certain attributes (e.g., a mature rating or a specific demographic group) or being accessed by consumers 135 having certain demographics. For example, a user profile associated with a consumer 135 may include user profile data specifying that the user profile is limited to viewing content that is rated for "general audiences." This may be a user profile associated with a child, for example. The content matching data for an advertisement may specify that the advertisement has a "mature" rating. The content host subsystem 110 can be configured to recognize this data and determine that the advertisement should not be matched to the particular consumer 135 based on the rating of the advertisement.

Content matching data may also include financial data that may influence content matching determinations. For example, the advertiser 130 may provide financial information associated with advertising content, including bid data such as a maximum bid amount that the advertiser 130 is willing to pay for placement (i.e., matching) of the advertising content. In certain examples, the maximum bid amount may specify an amount of money that the advertiser 130 is willing to pay as a fee for each time an advertising content instance is matched to a media content instance and provided for experiencing by a consumer 135. This may be referred to as a per-view advertising fee.

Additionally or alternatively, advertising fees may be based at least in part on other predetermined actions (i.e., a per-action fee basis). For example, an advertiser 130 may agree to pay a fee for the occurrence of any measurable action such as when an advertising content instance generates a lead (a user experiencing the advertisement requests additional information such as by selecting a hyperlink to an advertiser website), transaction (e.g., a sale), or other measurable event. In alternative embodiments, advertisers 130 may enter into a type of fee arrangement other than fee-per-event basis (e.g., a set fee for advertisement placement for a specific period of time). As described further below, the bid data may be used by the content host subsystem 110 to match advertising content to media content, with advertising content having higher bids generally being given preference over advertising content having lower bids.

The content host subsystem 110 may receive and apply advertiser bids in an auction format. For, example, advertisers 130 may bid to secure a right to have their respective advertising content instances matched to media content instances that satisfy particular content matching criteria. For example, advertisers 130 may bid for the right to have advertising content placed during a specific time period, for a particular segment of the lifespan of media content, or while media content surpasses a particular popularity threshold. Alternatively, bid data associated with advertising content may be dynamically considered on a match-by-match process. The bid data may be factored into a match assessment and may be given any weight as may best suit a particular application. In certain embodiments, bid data may be used to select from a plurality of advertising content instances that at least satisfy a relevancy threshold for being matched to a particular media content instance. The advertising content instance having the highest bid may be selected, which can help maximize advertising fees and revenues to the benefit of the content producers 125 and the party distributing the media content. In other words, the auction-style bids may help increase the revenue generated by the system 100 as advertisers 130 vie for content matching priority.

The advertiser 130 may also specify a maximum amount not to be exceeded for distribution of an advertising content instance or for multiple advertising content instances included in an advertising campaign. The fee limit may be for the entire publication period of advertising content as specified by the advertiser 130 (i.e., a campaign limit), or for a smaller recurring time period. For example, the advertiser 130 may set a daily fee limit. Once distribution of the advertising content instance(s) causes advertising costs to reach the predefined maximum limit, the content host subsystem 110 will abstain from matching the advertising content instance(s), at least for the remainder of the time period associated with the limit (e.g., a daily fee limit).

By providing the advertiser 130 with tools for specifying content matching data, the content host subsystem 110 provides the advertiser 130 with significant and detailed control over the matching of advertising content to media content. The detailed level of control provided by the system 100 can improve the effectiveness (e.g., the return on investment) of targeted advertising as compared to convention target advertising techniques. To illustrate the detailed control available to advertisers 130, a particular advertiser 130 who uploads an advertising content instance can provide content matching data specifying that the advertising content instance should only be matched with media content instances having a at least a predefined level of popularity and not having an adult or mature content rating. For example, the advertiser 130 could further specify that the advertising content should only be matched with media content instances when the media content instances are being accessed by a male consumer 135 who is 18-34 years of age and who viewed the most recent episode of a show currently on television called "LOST". In this or similar manner, the advertiser 130 is able to provide detailed content matching criteria that can be used to target a desired demographic on a consumer-by-consumer basis and to control the type of media content to which advertising content may or may not be appended. The detailed level of control provided to advertisers 130 also enables them to specify specific events (e.g., a download of a particular media content instance) to be considered when matching advertising content to media content.

The content host subsystem 110 may be configured to provide the advertiser 130 with one or more user interfaces having tools enabling the advertiser 130 to provide advertising content and associated information. The user interface may also include tools for tracking and managing advertising content and content matching data that has been provided to the content host subsystem 110. The tools may enable the advertiser 130 to monitor the distribution of advertising content (e.g., the number of times an advertising content instance has been matched and presented to consumers 135) and the fees charged for distribution of the advertising content. Information provided to the advertiser 130 may be tracked and updated in real time and may include, but is not limited to, a list of active advertising content instances, statistics about the performance and/or distribution of the advertising content, content syndication statistics and information (e.g., percent of downloads initiated at affiliate 140 sites), advertising fee statistics, demographics of consumers 125 experiencing the advertising content, data associated with media content to which the advertising content is matched, content trends (e.g., matching trends), and feedback (e.g., ratings) provided by consumers 125.

FIG. 4 illustrates an exemplary graphical user interface 400 that may be presented to an advertiser 130 by way of an access device 120. As shown in FIG. 4, the advertiser 130 may be provided with tools for managing advertising content and associated accounts and data. Exemplary tools enable the advertiser 130 to add and remove advertising content, view ratings and reviews of advertising content, view fees charged for distribution of the advertising content, view overall statistics (e.g., distribution metrics for advertising content), links to media content having high ratings, high download rates, or other desirable performance levels, links to demographic and/or other information for consumers 135 who have provided ratings for or other comments about advertising content (which may help advertisers 130 qualify or disqualify the feedback), view advertising content-specific statistics, view messages from other users, and view and change settings, including updating content matching data to attempt to improve the targeted distribution of the corresponding advertising content.

In the view shown in FIG. 4, an advertisement-specific statistics option (i.e., "Ad Stats") is selected and corresponding information displayed. With this option selected, the user interface 400 may present a list of active advertising content instances and information (e.g., statistics) associated with each advertising content instance. Examples of such information include but are not limited to an advertising content identifier (e.g., an ad title), visual image from the advertising content instance, start and end dates for the time period in which the advertising content instance is active (i.e., published), the number of times the advertising content instance has been accessed (e.g., viewed, downloaded, or otherwise experienced by consumers 135), the amount of accumulated fees charged for distribution of the advertising content instance, the average fee per view for the advertising content instance, and the advertiser-specified maximum fee limit for the advertising content instance. The example shown in FIG. 4 is illustrative only and not restrictive in any sense. In other examples, different information may be provided to the advertiser 130 in a user interface. For example, daily statistics may be shown and may include a bar chart illustrating the number of views per day. By way of another example, the user interface 400 may include user rating information (e.g., the average user rating for the advertising content instance) and the number of users that have rated the advertising content instance.

The graphical user interface 400 may also include a summary of statistics for the particular advertiser 130. The summary may include, but is not limited to, the number of active advertising content instances, an overall average rating of published advertising content, total number of access events (e.g., views) for the active advertising content instances, the current actual rate at which the advertising content is being accessed (e.g., current number of views per minute), and overall fee information such as current fees associated with the active advertising content instances and/or total fees charged (e.g., year-to-date fees), total fees paid by the advertiser 130, current fee balance, and overall average fee per view.

Through the graphical user interface 400, which may also be referred to as advertiser dashboard 400, the advertiser 130 is able to view and manage advertising content instances, including viewing any of the above-described information, publishing new advertising content instances, removing published advertising content instances, setting maximum ad placement fees, and modifying information (e.g., content matching data) associated with the advertising content instances.

The advertiser dashboard 400 provides the advertiser 130 with significant capability to provide advertising content, control and target the distribution of the advertising content, manage the active advertising content, and monitor the distribution of the advertising content. The information included in the advertiser dashboard 400 may include up-to-date information that is updated in real time or near real time. For example, upon providing advertising content to a consumer 135, the content host subsystem 110 may record and provide updated distribution and fee data for inclusion in the advertiser dashboard 400.

Any of the above-described information that may be included in the advertiser dashboard 400 and that relates to the distribution of advertising content may be collectively referred to as real time distribution or matching metrics. In some examples, the distribution metrics may be exported to other applications such as a spreadsheet application. The type and/or amount of information included in the real time distribution metrics may be based on advertiser agreements. Thus, in certain embodiments, an advertiser 130 may pay a premium for access to certain information.

With the above-described tools, the advertiser 130 is able to conveniently target advertising content with a significant level of control. The advertiser 130 has detailed control over the content matching data that will be used by the content host subsystem 110 to identify and provide advertising content to consumers 135. The content host subsystem 110 enables the advertiser 130 can monitor the real-time distribution of the advertising content, as well as advertising fees charged for placement of the advertising content.

G. Content Host Subsystem

The content host subsystem 110 may be implemented in or include one or more computing devices configured to perform the processes described herein. In certain embodiments, elements of the content host subsystem 110 may include any computer hardware and/or instructions (e.g., software programs), or combinations of software and hardware, configured to perform the processes described herein. In particular, it should be understood that elements of the content host subsystem 110 may be implemented on one physical computing device or may be implemented on more than one physical computing device. Accordingly, the content host subsystem 110 may include any one of a number of well known computing devices, and may employ any of a number of well known computer operating systems, including, but by no means limited to, known versions and/or varieties of the Microsoft Windows® operating system, the Unix operating system, Macintosh® operating system, and the Linux operating system.

Accordingly, the processes described herein may be implemented at least in part as instructions executable by one or more computing devices. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

FIG. 5 illustrates an exemplary content host subsystem 110. While an exemplary content host subsystem 110 is shown in FIG. 5, the exemplary components illustrated in FIG. 5 are not intended to be limiting. Indeed, additional or alternative components and/or implementations may be used. Each of the components of the exemplary content host subsystem 110 will now be described in additional detail.

1. Access Module

The content host subsystem 110 may include an access module 510 configured to receive and/or provide any of the content and data described above, including media content, advertising content, media content attribute data, user profile data, content matching data, updates to content and data, requests to access content, and real time performance and distribution statistics. The access module 510 may be configured to send and receive content, data, and other communications over the network 115. The access module 510 may include and/or support any suitable communication technologies for communicating with the access devices 120 over the network 115. For example, the access module 510 may include one or more servers (e.g., a media content server and/or web server) configured to send and receive communications over the network 115.

The access module 510 may receive access requests and authentication information from one or more of the access devices 120. The access module 510 may verify the authentication information and use the information to identify a corresponding user profile. The access module 510 may also identify a category (e.g., a consumer 135) of the user associated with the user profile. The access module may provide one or more user interfaces and/or associated content and data to an authenticated access device 120. The user interface may be selected based on the user profile and category of user associated with the authentication information. For example, a consumer 135 may be provided with a user interface that is specific to consumers 135, an advertiser 130 may be provided with a user interface that is specific to advertisers 130, and a content producer 125 may be provided with a user interface that is specific to content producers 125. Certain data (e.g., content performance statistics for a particular content producer 125) included in the user interface may be specific to the user profile.

Access requests may be configured to request content from the content host subsystem 110. For example, a consumer 125 may request access to media content (e.g., a pay-per-view or on-demand media content instance). As mentioned above, an access request may be to download media content from the content host subsystem 110 to locally access and playback previously-downloaded media content stored on an access device 120. For instance, when a consumer 125 requests to download a media content instance or initiates playback of a locally stored media content instance, the access device 120 may provide an access request to the content host subsystem 110 for advertising content to be matched to the media content instance. As described below, the content host subsystem 110 may match advertising content to the access devices 120.

The advertising content may be transmitted over the network 115. For download requests, the content host subsystem 110 may combine the advertising content to the requested media content. Alternatively, the advertising and media content may be transmitted separately and combined at the access device 120. For requests to access locally stored media content, the content host subsystem 110 may provide the advertising content, which may be combined with the media content at the access device 120.

Other access requests may be configured to request data such as media content attribute data, content matching data, user profile data, content performance statistics, content distribution statistics, content consumption trends, account data, fee data, revenue data, or other data stored by the content host subsystem 110. For example, a content producer 125 may request access to data associated with media content, including performance, distribution, revenue, and/or other media content attribute data, and an advertiser 130 may request access to data associated with advertising content, including distribution, revenue, and/or other content matching data. The access module may be configured to provide any content and/or data to one or more access devices 120 over the network 115.

Content and data received by the access module 510 may be propagated through to a data management module 515 for storage in a data store 520. In this manner, data and content hosted by the content host subsystem 110 can be provided and kept up to date by users of the system 100.

2. Data Store

Data store 520 may include one or more data storage mediums, devices, or configurations and may employ any type, form, and combination of storage media known to those skilled in the art, including hard disk drives, read-only memory, caches, databases, optical media, and random access memory. Data store 520 may include any known technologies useful for storing, updating, searching, modifying, accessing, retrieving, and deleting content and data. While FIG. 5 illustrates a single data store 520, the data store 520 may include multiple data storage media, databases, or devices.

Data store 520 may store any suitable type or form of electronic data representative of the content and data described above, including media content, media content attribute data, user profile data, advertising content, and content matching data, which are represented in FIG. 5 as reference numbers 522, 524, 526, 528, and 530, respectively.

The data and content stored in the data store 520 may be updated to reflect changes provided by users of the system 100. The data and content stored in the data store 520 can also be updated in accordance with tracked data generated by the content host subsystem 110. As described further below, certain components of the content host subsystem 110 may be configured to track certain events and generate data descriptive of the events. Such data may be stored in data store 520. For example, tracked performance and distribution data may be stored in data store 520. Examples of tracked data will be described further below. Updates to the data stored in data store 520 may be performed in real time or near real time. Accordingly, users may be provided with access to up-to-date real time information.

3. Data Management Module

Data management module 515 may include any devices and technologies configured to manage the data stored in data store 520, including accessing, updating, searching, modifying, deleting, and adding to the data. The data management module 515 may communicate with other components of the content host subsystem 110 to receive data and instructions, as well as to provide copies of data. For example, the access module 510 may provide updated data and instructions to the data management module 515 for use in updating the data in data store 520, or the access module 510 may instruct the data management module 515 to retrieve a copy of a particular media content instance that has been requested by a consumer 135.

4. Tracking Module

The tracking module 540 may include any devices and technologies for tracking events processed by or that are detectable by the content host subsystem 110. The tracked events may be recorded in logs, which can be stored as data in the data store 520. The tracked events may also be used to generate other data that may be stored in the data store 520, including a current popularity score of a media content instance, for example. The tracking module 540 may provide tracked data to the data management module 515 for storage in the data store 520. The tracked data may be used when identifying advertising content to be matched to media content, as described below.

In certain embodiments, the tracking module 540 may be configured to track access requests, or at least certain types of access requests, received by the access module 510. For example, the tracking module 540 may track and log media consumption events such as requests for media content. When a consumer 135 elects to access (e.g., download) a particular media content instance, for example, the tracking module 540 may record data representative of the event. The tracking module 540 may provide the data representative of the event to the data management module 515, along with instructions to add the data to one of more media consumption logs or histories.

The logs of tracked events can be user-specific. Accordingly, the content host subsystem 110 can maintain user-specific media consumption histories descriptive of individual media content viewing events. The user-specific histories may be included in or otherwise associated with user profile data of user profiles. From the histories, the media consumption habits (e.g., viewing habits) and/or specific media consumption events exhibited by consumers 135 can be accessed and taken into consideration when identifying advertising content to be matched to media content being accessed by consumers 135. For example, an advertiser 130 may provide content matching data that will direct the content host subsystem 110 to match an advertising content instance only to consumers 135 who have in the past accessed a particular media content instance (e.g., SPORTSCENTER) or particular genre of media content instances (sports-related media content). The content host subsystem 110 can access user profile data including tracked media consumption information to determine whether this content matching criterion has been satisfied.

Additionally or alternatively to user-specific histories, the content host subsystem 110 may be configured to generate media-specific histories from tracked media consumption events. From tracked media access requests, for example, the content host subsystem 110 may generate and maintain media-specific histories descriptive of access events for specific media content instances. For instance, the tracking module 540 may record each request received to access a particular media content instance. The tracked requests may be compiled into a history that is specific to the media content instance. The history may be stored as part of the media content attribute data associated with the media content instance.

From media-specific histories of media consumption events, the popularity of media content may be determined. For example, the content host subsystem 110 may quantify a popularity score such as the number of times that a media content instance has been accessed within a certain time period (i.e., a current and actual access rate). The popularity score may be determined dynamically in real time, periodically, or when a predetermined event is detected to have occurred (e.g., an access request for the media content instance is received).

Figure 6:
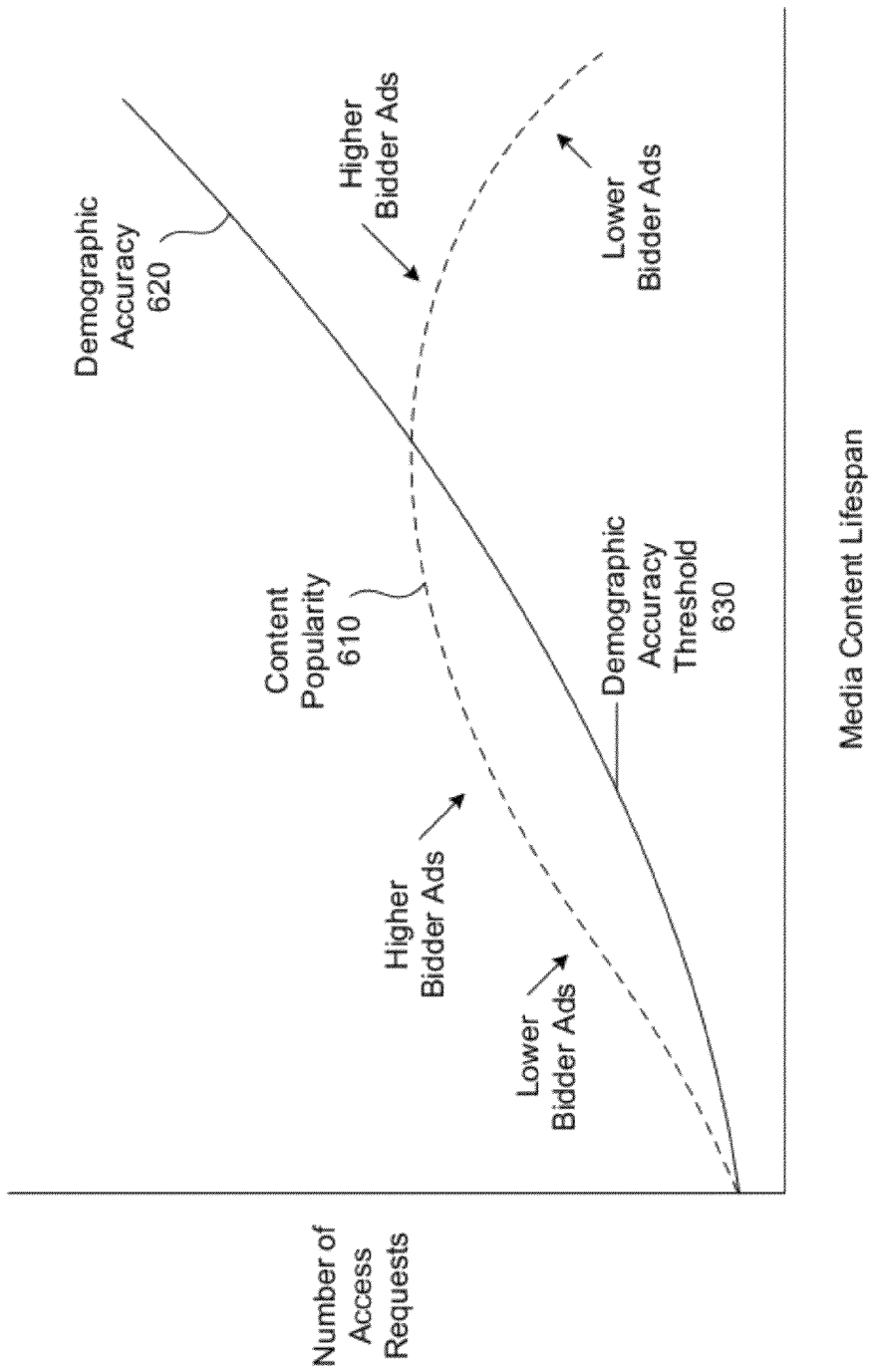
FIG. 6 is a graphical illustration of quantified popularity and demographic accuracy over the lifespan of a media content instance.

FIG. 6 is a graphical illustration of quantified popularity over the lifespan of a particular media content instance. Dashed line 610 is representative of a popularity curve for the media content instance. Each point on the popularity curve may be representative of a popularity score at a given time during the lifespan of the media content instance. The lifespan may be the time during which the media content instance is published and available for access by consumers 135.

The popularity curve may in some cases form a bell or similar curve representative of a viral distribution of media content. As more consumers 135 become aware of a media content instance, the rate at which consumers 135 access the media content instance generally increases until a peak popularity point is reached. At this point, the access rate may begin to decline because many consumers 135 have already experienced the media content instance.

As described below, the content host subsystem 110 may be configured to take into account the popularity score of a media content instance when identifying advertising content to be matched with the media content instance. This enables the content host subsystem 110 to provide tools that allow advertisers to control the matching of advertising content based on the popularity of media content. Some advertisers 130 may be willing to pay a premium (e.g., a higher placement bid) to have advertising content matching with media content at or near the peak of its popularity.

From tracked media consumption events, the content host module 110 may determine actual demographic data of consumers 135 accessing media content. For example, for an access request, the tracking module 540 may be configured to identify from user profile data the demographic data of the consumer 135 requesting access to media content. Such data can be compiled to determine media consumption trends for media content, including the demographics of users expressing an interest in the media content. The compiled data may be stored in data store 520 as part of the media content attribute data for a media content instance. The actual user demographic data associated with media content can be considered when identifying advertising content to be matched with the media content instance.

In certain embodiments, the user demographics of actual consumers of media content may be used to qualify media content attribute data (e.g., intended audience) provided by a content producer 125. In some cases, for example, the actual consumer demographic information can be given more weight than the user-provided target audience data. This can improve the accuracy of the system 100 by self-correcting user-provided data that turns out not to be accurate. For example, a content producer 125 may believe that a particular one of his media content instances is targeted to a first demographic of consumers 135, but actual requests for the media content instance may indicate that a second demographic of consumers 135 is more interested in the media content instance. With the demographic data for the actual consumers 135 of the media content instance, the content host subsystem 110 may account for actual distribution patterns and associated demographic data when matching advertising content to the media content instance.

As the number of requests for a media content instance increases, the accuracy of tracked demographic data for the media content instance generally increases. FIG. 6 illustrates a demographic accuracy curve 620 along the lifespan of a media content instance. The content host subsystem 110 may include a predefined demographic accuracy threshold 630 that when reached by the demographic accuracy curve 620, will cause the content host subsystem 110 to increase the weight given to the tracked user demographic data associated with consumers 135 of a media content instance. In other words, once a sufficient number of consumers 135 have accessed the media content instance, the content host subsystem 110 may deem the tracked user demographic data to be accurate enough to be given additional weight or otherwise qualify user-provided target audience data when identifying advertising content to be matched to the media content instance.

Tracked media consumption events may also be used to generate history-based demographic data that is specific to consumers 135. For example, when a media content instance is accessed, demographic data of the consumer 135 accessing the media content instance may be recorded and included in the media content attribute data associated with the media content instance, as described above. In some cases, this demographic data may be used to estimate user demographic data for other consumers 135 who access the same media content instance. For example, a consumer 135 may access a media content instance. From the access log for the media content instance, demographic data of consumers 135 who have accessed the media content instance in the past may be used to predict the demographic data of the consumer 135 who is requesting access to the media content instance. For instance, a majority of consumers 135 who have accessed the media content instance in the past may have demographic data indicating that the consumers 135 are male and between the ages of eighteen and thirty-two. This demographic data may be extrapolated to the consumer 135 who is currently requesting access to the media content instance. This extrapolated demographic information may be added to and included in the user profile data for the consumer 135. This extrapolated demographic information may be especially helpful when the user profile data for the consumer 135 is sparse.

User demographic data that is based on actual media consumption events may improve the accuracy of the system 100, especially in cases where the actual interests and media consumption habits of a consumer 135 are outside the norm of his or her user-provided demographic information. History-based user demographic data may be especially useful when a consumer 135 has provided little or no demographic information. In this situation, the content host subsystem 110 may use the actual media access patterns of the consumer 135 and data associated with the accessed media content to estimate specific consumer demographic data.

The content host subsystem 110 may be configured to place limitations on the estimation of user demographic data. In certain embodiments, for example, history-based demographic information may be attributed to a consumer 135 only when the demographic data being relied upon is deemed to be accurate. For example, the content host subsystem 110 may be configured to utilize the tracked user demographic data associated with a media content instance to estimate user demographic data for a consumer 135 only when the demographic accuracy curve 620 has reached a predefined demographic accuracy threshold such as threshold 630 of FIG. 6.

As described further below, any of the tracked data or data derived from the tracked data may be utilized by the content host subsystem 110 when matching advertising content to media content. This enables the content host subsystem 110 to base selections of advertising content on actual events, preferences, histories, and trends that have been tracked by the tracking module 540. The tracked data may be integrated into any of the user profile data, media content attribute data, and content matching data for use when matching advertising content to media content.

5. Matching Module

Returning to FIG. 5, the content host subsystem 110 may include a matching module 550, which may include any devices and technologies for selectively matching advertising content to media content. The matching may be based on media content attribute data, user profile data, and content matching data stored in data store 520. The media content attribute data, user profile data, and content matching data may include any of the types of information described above, including data provided by consumers 135, data provided by advertisers 130, data provided by content producers 125, and data tracked and/or generated by the content host subsystem 110.

The matching may be performed dynamically. In other words, the matching may be performed in real time and be based on a current snapshot of media content attribute data, user profile data, and content matching data stored in data store 520. In certain embodiments, the matching may be based on a comparison of a current snapshot of user profile data, a current snapshot of media content attribute data, and a current snapshot of content matching data. Data included in the three snapshots may be compared to determine a current match value of each potential match. That is, a match value may be determined for each advertising content instance for which the content matching data is satisfied by the media content attribute data and the user profile data. The match values may be based on the bid data included in the content matching data, and in certain embodiments, the matching module 550 may be configured to select one or more of the potentially matching advertising content instances having relatively higher bid data. Such an approach is intended to help spur competition among advertisers and may help to drive up advertising fees and revenues, which benefits content producers 125 and the party distributing the media content.

In certain embodiments, the matching module 550 may be configured to match advertising content each time that a request to access media content is received. For example, the access module 510 may receive a request from an access device 120. The request may be to download a particular media content instance, or the request may inform the content host device 110 that the access device 120 has been requested to present locally stored media content. The request and the information associated therewith (e.g., a media content identifier for the media content being accessed and a user profile identifier for the consumer 135 accessing the media content) may be provided to the matching module 550, which can use the request and associated information to access corresponding data in the data store 520 and identify and match advertising content to the media content being accessed.

Because of the dynamic nature of the matching operation, each selected advertising content instance can be custom-picked based on up-to-date data. Each time media is accessed, the matching of advertising content may be based on a different snapshot of data. Accordingly, different consumers 135 may experience different advertisements when viewing the same media content, and different advertisements may be provided with different viewings of the same media content. This is at least because user profile data, media content attribute data, and content matching data may be updated in real time as the tracking module 540 records media consumption events and users update user-provided data.

In certain cases, for example, a first advertisement may be presented to a consumer 135 accessing a media content instance a first time, and a second advertisement may be presented to the consumer 135 subsequently accessing the same media content instance a second time. Accordingly, a consumer 135 who has downloaded or recorded a particular media content instance can be presented with different advertisements each time the media content instance is accessed and experienced locally. As the media content instance is being accessed (e.g., played) locally by an access device 120, the access device 120 can recognize a pre-designated placeholder for advertising content and send a request to the content host subsystem 110 for one or more advertising content instances to be inserted at the placeholder. The requests may be sent and fulfilled in real time. Alternatively, advertising content may be selected and provided in advance of the consumer 135 accessing the media content such as periodically during off-peak access times (e.g., late at night).

The matching module 550 may be configured to give weight and/or priority to the different data used to match advertising content to media content. In some cases, for example, the matching module 550 may give more weight to user profile data (e.g., user demographic and/or media viewing history data) than to media content attribute data (e.g., the genre and/or the popularity level of media content). This configuration may be preferred by advertisers 130 who are more concerned about reaching a particular demographic than about the types of media content to which advertising content will be matched. Conversely, other advertisers 130 trying to reach a broad demographic of consumers 135 may be more concerned about the type of media content to which advertising content will be matched.

In certain embodiments, the content host subsystem 110 may provide advertisers 130 with at least a share of control over how the content host subsystem 100 will weight or prioritize different content matching criteria. For example, an advertiser 130 may provide content matching data indicating that a corresponding advertising content instance should be matched to consumers 135 over the age of fifty who have viewed a currently available television show called "WHEEL OF FORTUNE" within the last week. The advertiser 130 may also be provided with tools allowing the advertiser to weigh and/or prioritize the two criteria. For example, the advertiser 130 may indicate that the age requirement should be prioritized over the "WHEEL OF FORTUNE" viewing requirement. This control over weight and priority to be given to content matching criteria helps increase the ability of the advertiser 130 to micro-target his advertising content.

To facilitate an understanding of the capabilities of the content host subsystem 110 for matching advertising content to media content in a highly targeted manner, a particular matching example will now be described. An advertiser 130 may upload an advertising content instance to the content host subsystem 110 via an access device 120. The advertising content instance may include subject matter designed to promote high-end golf equipment. The advertiser 130 may provide content matching data to be considered when matching the advertising content instance. The content matching data may indicate that the advertiser 130 wishes the advertising content instance be matched to consumers 135 who have accessed media content showing one or more recent professional golf tournaments such as the last "Ryder Cup" and/or "PGA Championship". The content matching data may also indicate that the advertiser 130 wishes the advertising content instance be matched to male consumers 135 who are over the age of eighteen (18).

The advertiser may also provide content matching data specifying criteria for media content to which the advertising content instance may be matched. For example, the content matching data may indicate that the advertiser 130 wishes the advertising content instance to be matched to media content instances having a "sports" genre, or the advertiser 130 may be more specific and specify that the advertising content instance should be matched to media content related to golf. The advertiser 130 may also specify that the advertising content is not to be matched to questionable media content such as media content having an "adult" rating. The advertiser 130 may also provide bid data such as a maximum fee that the advertiser 130 is willing to pay for each placement of the advertising content instance.

When the content host subsystem 110 receives an access request from an access device 120 associated with a consumer 135, the content host subsystem 110 may dynamically find advertising content to match with the requested media content instance. The advertising content instance relating to golf may be considered as a potential match. For example, the matching module 550 may compare the content matching data associated with the advertising content instance to the user profile data associated with the consumer 135 and the media content attribute data associated with the requested media content to determine whether the advertising content instance satisfies the matching criteria, or whether the advertising content instance fits the matching criteria better than other available advertising content. Specifically, the matching module 550 may determine whether the user profile data associated with the consumer 135 requesting the media content instance indicates that the consumer 135 accessed the last "Ryder Cup" and/or the "PGA Championship", and is a male at least eighteen (18) years of age. The matching module 550 may also determine whether the media content attribute data associated with the media content instance being requested indicates that the media content instance is of a "sports" genre or related to golf and does not have an "adult" rating.

If the user profile data and the media content attribute data match these content matching criteria, the advertising content instance may be considered a potential match to the media content instance. The matching module 550 may then determine a match value for matching the advertising content instance to the media content instance. In certain embodiments, the match value is equal to or otherwise based on the maximum bid amount provided by the advertiser 130 for the advertising content instance. In other embodiments, the bid data may be combined with the degree to which the content matching criteria are satisfied by the user profile data and the media content attribute data. The match module 550 may be configured to select the advertising content instance having the highest match value and provide it to the access device 120 for presentation with the media content instance being accessed. Of course, more than one advertising content instance may be selected and provided.

The advertiser 130 may wish to provide a criterion relating to the popularity of the media content to which the advertising content instance should be matched. Accordingly, the content matching data may also include one or more criteria related to the popularity of media content. In the golf advertising content example described above, the advertiser 130 may specify a media content popularity threshold that should be reached before the advertising content instance will be matched to media content. For example, the advertiser 130 may specify that the advertising content instance should be matched only to media content having a current popularity score that at least meets the threshold. The threshold may be based on an actual access rate, such as number of times that the media content has been accessed within a minute or an hour, for example. The popularity threshold may be especially useful for advertisers wishing to have their advertising content reach a large audience and/or be associated with trendy media content.

The popularity of media content may drive up the match values for advertising content to be matched to the media content. Referring again to FIG. 6, the popularity curve 610 is essentially a bell curve having a peak of popularity for a media content instance. The popularity of the media content increases as more consumers 135 access the media content. As the popularity increases, an increased number of advertising content instances may be considered for each match at least because popularity threshold criteria have been satisfied for a greater number of advertising content instances. The increase in potentially matching advertising content instances also brings an increased number of maximum bid amounts to be considered, the more maximum bid amounts may generally increase the match values, especially because advertisers 130 may be willing to pay more to have advertising content matched to popular media content. Thus, as shown in FIG. 6, higher bidder advertisements may be matched at or near the peak of the bell curve, and lower bidder advertisements may be matched at off-peak segments of the media content lifespan.

Accordingly, advertisers 130 can use popularity criteria to ensure that advertising content is matched as a desired popularity level along a media content lifespan and to control advertising fees based on the popularity of the media content. The popularity of the media content can be leveraged to increase advertising fees and thereby maximize the value of the media content.

Once advertising content has been matched, it may be provided to the access device 120 associated with the access request by way of the access module 510, as described above. The advertising content may be stitched in front of, behind, or at other placeholder within a media content instance for presentation along with the media content.

6. Transcoder Module

Returning to FIG. 5, the content host subsystem 110 may include a transcoder module 560, which may include any devices and technologies for decoding and/or encoding digitally-represented content from/to various data formats. With the transcoder module 560, the content host subsystem 110 is able to receive and provide content in a variety of formats and over different networks using different communications protocols and technologies. For example, a media content instance may be received in a first media format that can be processed (e.g., decoded) by only a subset of access devices 120 (set-top boxes) connected to the network 115. The transcoder module 560 may convert the media content instance to a second media format that can be processed by other access devices 120 (e.g., wireless phones) connected to the network 115. Accordingly, the transcoder module 560 can help extend the distribution of content to multiple different platforms.

7. Revenue Module

The content host subsystem 110 may include a revenue module 570 configured to determine and distribute advertising revenue generated by the system 100. The revenue module 570 may utilize advertising distribution statistics tracked by the tracking module 540, as described above. The revenue module 570 may use the recorded data to determine the fees to be charged to advertisers 130 for distribution of advertising content. In some embodiments, the advertisers 130 pay a fee for each time corresponding advertisements are matched and provided consumers 135.

The revenue module 570 may divide revenue from the advertising fees between the appropriate content producers 125 and the party or parties distributing the media content, including the operator of the content host subsystem 110, as well as affiliates 140 in some cases. For a particular media content instance, for example, the revenue module 570 may determine the fees charged to advertisers 130 for matching of advertising content to the media content instance. The revenue from the fees associated with the media content instance may then be divided between the content producer 125, the operator of the content host subsystem 110, and perhaps an affiliate 140. The division may be in accordance with a predefined revenue sharing ratio, which may be set by the operator of the content host subsystem 110, or negotiated with the content producer 125 and/or affiliate 140.

III. Exemplary Process Views

Figure 7:
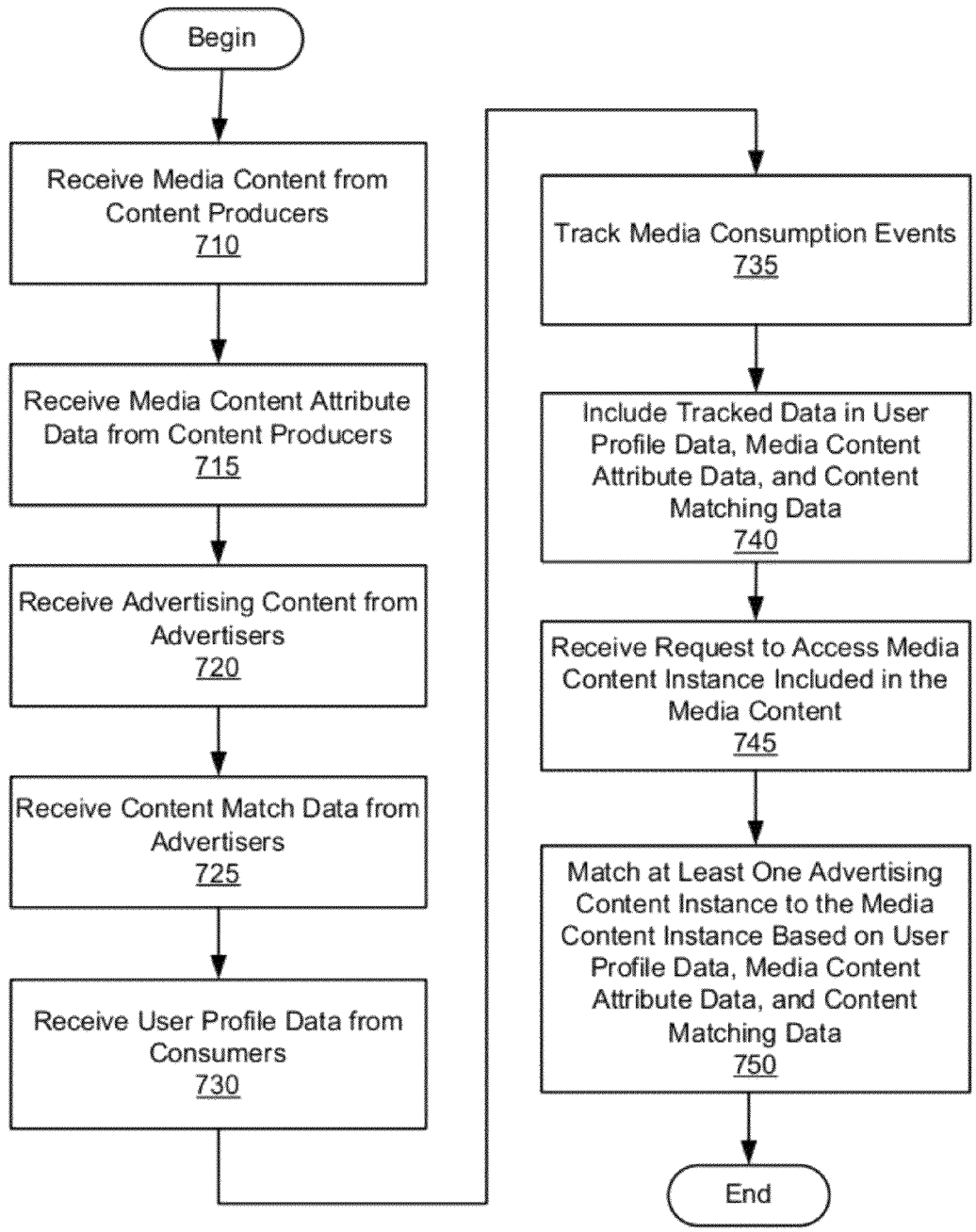
FIG. 7 is a flowchart illustrating an exemplary method of hosting and matching advertising content to media content.

FIG. 7 illustrates an exemplary method of hosting and matching advertising content to media content. While FIG. 7 illustrates exemplary steps according to one embodiment, other embodiments may omit, add to, reorder, and/or modify any of the steps shown in FIG. 7.

In step 710, media content is received from content producers 125. Step 710 may be performed in any of the ways described above, including the content host subsystem 110 receiving media content transmitted over network 115 from one or more access devices 120 associated with the content producers 125.

In step 715, media content attribute data is received from the content producers 125. Step 715 may be performed in any of the ways described above, including the content host subsystem 110 receiving media content attribute data transmitted over network 115 from one or more access devices 120 associated with the content producers 125.

In step 720, advertising content is received from advertisers 130. Step 720 may be performed in any of the ways described above, including the content host subsystem 110 receiving advertising content transmitted over network 115 from one or more access devices 120 associated with the advertisers 130.

In step 725, content matching data is received from the advertisers 130. Step 725 may be performed in any of the ways described above, including the content host subsystem 110 receiving content matching data transmitted over network 115 from one or more access devices 120 associated with the advertisers 130.

In step 730, user profile data is received from consumers 135. Step 730 may be performed in any of the ways described above, including the content host subsystem 110 receiving user profile data transmitted over network 115 from one or more access devices 120 associated with the consumers 135.

In step 735, media consumption events are tracked. Step 735 may be performed in any of the ways described above, including the tracking module 540 of the content host subsystem 110 tracking media consumption events such as media access requests received from access devices 120 associated with consumers 135.

In step 740, tracked data is included in user profile data, media content attribute data, and content matching data. Step 740 may be performed in any of the ways described above, including the tracking module 540 of the content host subsystem 110 providing tracked data or data derived therefrom to the data management module 515 for storage in the data store 520. Accordingly, user profile data, media content attribute data, and content matching data stored in the data store 520 may include user-provided information and tracked information and may be updated dynamically and in real time such that current snapshots of the data can be used when matching advertising content to media content.

Steps 710-740 may be performed interchangeably with one another and at different times. Accordingly, data in data store 520 may be continually updated such that current snapshots of the data can be used to select appropriate advertising content to be matched to media content.

In step 745, a request to access a media content instance included in the media content may be received. Step 745 may be performed in any of the ways described above, including the content host subsystem 110 receiving the access request from an access device 120 associated with a consumer 135.

In step 750, at least one advertising content instance included in the advertising content is matched to the media content instance based on user profile data, media content attribute data, and content matching data. Step 750 may be performed in any of the ways described above and may be based on any information or combination(s) of information included in the user profile data, media content attribute data, and content matching data. Step 750 may be performed dynamically and may be based on a real time snapshot of the data included in the data store 520 of the content host subsystem 110.

IV. Alternative Embodiments

The preceding description has been presented only to illustrate and describe exemplary embodiments with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The above description and accompanying drawings are accordingly to be regarded in an illustrative rather than a restrictive sense.

What is claimed is:

1. A system comprising:
   a data store, including
      at least a subset of media content,
      media content attribute data associated with the media content, where the media content attribute data selectively includes:
         content-provider-target-demographic data that specifies target demographic information for the associated instance of media content, and
         media-consumption-demographic data that is determined from media-consumption-events related to the associated instance of media content,
      user profile data associated with at least one consumer having access to the media content,
      advertising content, and
      content matching data associated with the advertising content, where at least a subset of the content matching data specifies a desired demographic;
   an access module communicatively coupled to an access device, said access module configured to receive a request sent by the access device, the request being for access to a media content instance included in the media content;
   a matching module configured to match at least one advertising content instance included in the advertising content to the media content instance based on the media content attribute data, user profile data, and content matching data; and
   wherein the matching module matches the at least one advertising content instance to the requested media content instance by matching the desired demographic of the content matching data to the content-provider-target-demographic data and the media-consumption-demographic data of the media content attribute data, giving a greater weight to the media-consumption-demographic data than to the provider-target-demographic data; and
   wherein said access module is further configured to provide the matched at least one advertising content instance to the access device for user presentation.

2. The system of claim 1, further comprising a tracking module configured to track media consumption events, to determine the media-consumption-demographic data from the tracked media consumption events, and to update at least one of the user profile data and media content attribute data stored in said data store based on the tracked media consumption events.

3. The system of claim 2, wherein said matching module is configured to dynamically match the at least one advertising content instance based on a generally real time snapshot of the media content attribute data, user profile data, and content matching data stored in said data store.

4. The system of claim 2, wherein the user profile data includes media consumption information descriptive of the tracked media consumption events associated with a user.

5. The system of claim 2, wherein said matching module is configured to give a greater weight to the media-consumption-demographic data than to the content-provider-target-demographic data by qualifying the content-provider-target-demographic data based on the media-consumption-demographic data.

6. The system of claim 2, wherein the media content attribute data includes a current popularity score associated with the media content instance.

7. The system of claim 6, wherein the current popularity score is determined in real time based on an actual access rate of the media content instance.

8. The system of claim 1, wherein the content matching data includes at least one of targeted media popularity criteria, and targeted media rating criteria associated with the advertising content.

9. The system of claim 1, wherein said matching module is configured to determine a match value for matching the advertising content instance to the media content instance, the match value being determined based on a combination of the user profile data, the media content attribute data, and the content matching data.

10. The system of claim 1, further comprising a tracking module configured to track media consumption events associated with the media content instance and to generate real time performance metrics based on the tracked media consumption events, said access module being configured to provide the real time performance statistics to a producer of the media content instance.

11. The system of claim 1, further comprising a tracking module configured to track advertising content distribution events associated with the advertising content and to generate real time distribution metrics based on the tracked advertising content distribution events, said access module being configured to provide the real time distribution metrics to advertisers associated with the advertising content.

12. A method comprising:
utilizing a computing system to receive a request over a network, the request being associated with a media content instance being accessed by a user;
matching, by the computing system, at least one advertising content instance to the media content instance at least in part by selecting, by the computing system, the at least one advertising content instance from a plurality of advertising content instances based on media content attribute data associated with the media content instance, user profile data associated with the user, and content matching data associated with the plurality of advertising content instances and provided by at least one advertiser; and
providing, by the computing system, the at least one advertising content instance over the network for presentation to the user,
wherein at least some of the media content attribute data includes:
content-provider-target-demographic data that specifies target demographic information for the associated instance of media content, and
media-consumption-demographic data that is determined from media-consumption-events related to the associated instance of media content, and
matching the at least one advertising content instance to the requested media content instance is done by causing the computing system to match the desired demographic of the content matching data to the content-provider-target-demographic data and the media-consumption-demographic data of the media content attribute data, giving a greater weight to the media-consumption-demographic data than to the provider-target-demographic data.

13. The method of claim 12, further comprising:
tracking, by the computing system, media consumption events associated with the media content instance;
determining, by the computing system, the media-consumption-demographic data from the tracked media consumption events, and
including tracked media consumption information representative of the media consumption events in at least one of the user profile data and the media content attribute data for use in said matching step.

14. The method of claim 13, further comprising:
receiving, by the computing system, the content-provider-target-demographic data from a producer of the media content instance; and
wherein said matching includes giving a greater weight to the user-event-demographic data than to the content-provider-target-demographic data by qualifying the content-provider-target-demographic data based on the media-consumption-demographic data.

15. The method of claim 13, further comprising:
generating, by the computing system, a popularity score for the media content instance in real time based on the tracked media consumption events; and
including the popularity score in the media content attribute data for use in said matching step.

16. A non-transitory computer-readable medium that includes computer-executable instructions, the instructions including instructions for:
receiving a request over a network, the request being associated with a media content instance being accessed by a user;
matching at least one advertising content instance to the media content instance at least in part by selecting the at least one advertising content instance from a plurality of advertising content instances based on media content attribute data associated with the media content instance, user profile data associated with the user, and content matching data associated with the plurality of advertising content instances and provided by at least one advertiser; and
providing the at least one advertising content instance over the network for presentation to the user,
wherein at least some of the media content attribute data includes:
content-provider-target-demographic data that specifies target demographic information for the associated instance of media content, and
media-consumption-demographic data that is determined from media-consumption-events related to the associated instance of media content, and
matching the at least one advertising content instance to the requested media content instance is done by causing the computing system to match the desired demographic of the content matching data to the content-provider-target-demographic data and the media-consumption-demographic data of the media content attribute data, giving a greater weight to the media-consumption-demographic data than to the provider-target-demographic data.

17. The medium of claim 16, the instructions further including instructions for:
tracking media consumption events associated with the media content instance;
determining the media-consumption-demographic data from the tracked media consumption events, and
including tracked media consumption information representative of the media consumption events in at least one of the user profile data and the media content attribute data for use in said matching step.

18. The medium of claim 16, the instructions further including instructions for:
receiving the content-provider-target-demographic data from a producer of the media content instance; and
wherein said matching includes giving a greater weight to the user-event-demographic data than to the content-provider-target-demographic data by qualifying the content-provider-target-demographic data based on the media-consumption-demographic data.

19. The medium of claim 16, the instructions further including instructions for:
generating a popularity score for the media content instance in real time based on the tracked media consumption events; and
including the popularity score in the media content attribute data for use in said matching step.

\* \* \* \* \*